United States Patent
Haratani et al.

(10) Patent No.: US 6,420,058 B1
(45) Date of Patent: Jul. 16, 2002

(54) MAGNETIC RECORDING MEDIUM

(75) Inventors: Susumu Haratani; Tsutomu Aoyama, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/506,687

(22) Filed: Feb. 18, 2000

(30) Foreign Application Priority Data

Feb. 19, 1999 (JP) .............................. 11-041234

(51) Int. Cl.$^7$ .............................. G11B 5/66; G11B 5/70; B32B 7/02
(52) U.S. Cl. .................. 428/694 T; 428/900; 428/213; 428/336
(58) Field of Search .................. 428/694 T, 694 B, 428/900, 65.3, 694 TP, 694 TC, 213, 336; 360/135, 131

(56) References Cited

U.S. PATENT DOCUMENTS

| | | | | |
|---|---|---|---|---|
| 5,590,009 | A | * 12/1996 | Ishida | 360/135 |
| 5,698,286 | A | 12/1997 | Ikarashi et al. | 428/65.3 |
| 6,139,936 | A | * 10/2000 | Weiss | 428/141 |
| 6,168,845 | B1 | * 1/2001 | Fontana, Jr. et al. | 428/65.5 |

FOREIGN PATENT DOCUMENTS

JP  11-296845  10/1999

OTHER PUBLICATIONS

Ohtsuka et al., "A NEw MAgnetic Disk with Servo Pattern Embedded under Recording Layer", IEEE Trans. Magn., vol. 33, No. 5, Sep. 1997, pp. 2620–2622.*

Stephen Y. Chou, "Patterned Magnetic Nanostructures and Quantized Magnetic Disks", Proceedings of the IEEE, vol. 85, No. 4, Apr. 1997, pp. 652–671.

* cited by examiner

*Primary Examiner*—Paul Thibodeau
*Assistant Examiner*—Holly Rickman
(74) *Attorney, Agent, or Firm*—Oblon, Spivak, McClelland, Maier & Neustadt, P.C.

(57) ABSTRACT

The invention aims to prevent inadvertent rewriting or erasure of servo information in a patterned medium based on the perpendicular recording mode. The magnetic recording medium of the invention includes recording tracks each having an array of unit minute recording portions of a magnetic material separated by non-recording portions of a nonmagnetic material. The recording tracks include data regions and servo regions. The unit minute recording portions in the data regions have substantially the same surface area as the unit minute recording portions in the servo regions. The invention satisfies $AR_S/AR_D \geq 1.5$ provided that the unit minute recording portion has an aspect ratio which is the thickness divided by the square root of the surface area, the unit minute recording portion in the data region has an aspect ratio $AR_D$, and the unit minute recording portion in the servo region has an aspect ratio $AR_S$.

16 Claims, 6 Drawing Sheets

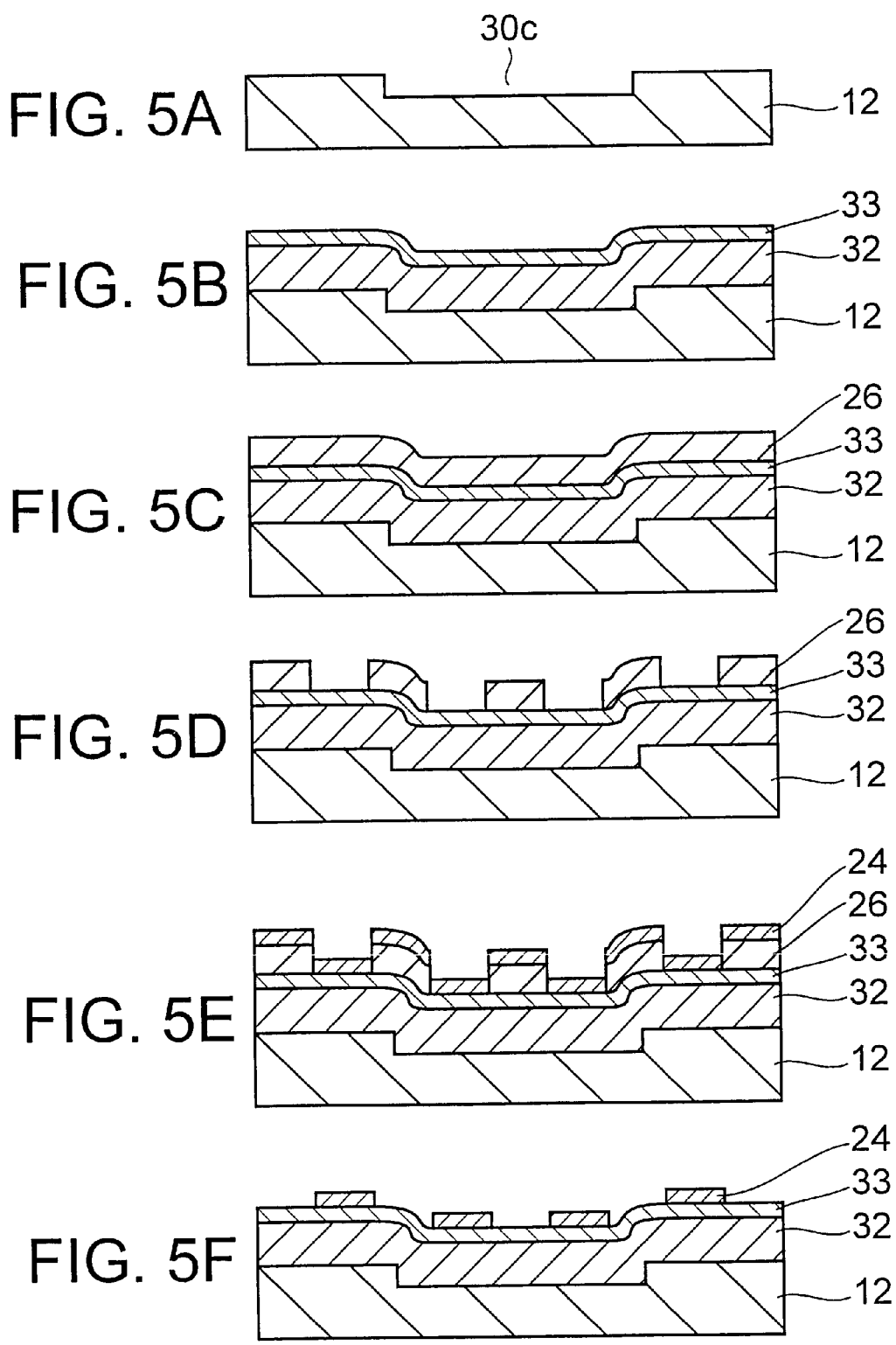

MAGNETIC RECORDING MEDIUM

BACKGROUND OF THE INVENTION

1. Technical Field

This invention relates to a magnetic recording medium, more particularly, to a magnetic recording medium for use in magnetic read/write equipment such as magnetic disk equipment known as hard disk drives (HDD), and further particularly, to the structure of a magnetic recording medium of the perpendicular recording type having a high recording density.

2. Background Art

High-capacity storage devices, especially hard disk drives featuring a high data transfer rate, quick access, high reliability and low price have marked a significant advance toward higher capacity and higher density. An improvement in areal recording density is accomplished by miniaturizing recording magnetic domains formed in the magnetic recording layer. At present, the density has exceeded 5 gigabits per square inch, with development efforts being made with the target on 10 gigabits to 100 gigabits.

Used as the magnetic head for write and read operation is a combined magnetic head in which an inductive head as the write head is combined with a magnetoresistive head (MR head) as the read head, which are mounted on a slider. Since the output of the MR head is determined by a magnetic flux change per circumferential unit length, in principle, the output does not decline even when the track width is minimized. The use of the MR head thus suggests a possibility to realize narrow tracks. The same applies to a giant magnetoresistive head (GMR head) with which a higher recording density is expected.

However, if the track width is too narrow, the interference or crosstalk between magnetic signals from adjacent recording tracks increases so that the degradation of read signals becomes a problem.

The areal recording density can also be increased by reducing the recording bit length. If the recording bit length is too short, the interference or partial erasure between magnetic signals from adjacent bits increases so that the degradation of read signals becomes a problem.

JP-A 9-297918 discloses a magnetic recording medium in which a plurality of recording portions are provided in the form of rectangular regions having two side lengths equal to a track width and a minimum bit-determining length, the plurality of recording portions are separated by space areas, and information is stored in the recording portions. This medium is a so-called patterned medium. The patterned medium is effective for suppressing the degradation of read signals by crosstalk and partial erasure.

The patterned medium permits the recording density to be further increased by employing the perpendicular recording mode.

SUMMARY OF THE INVENTION

In addition to regions where ordinary information is recorded, the magnetic recording medium in the hard disk drive must have regions for recording servo information for tracking by the magnetic head. However, it was not discussed in the prior art how to record servo information in a patterned medium of the perpendicular recording type.

The inventors have reached the conclusion that in a patterned medium, like data recording, servo information may be recorded in minute recording portions (to be referred to as unit minute recording portions, hereinafter). In that event, however, there arises a problem that servo information can be inadvertently rewritten or erased when data are recorded or erased.

An object of the invention is to prevent inadvertent rewriting or erasure of servo information in a patterned medium based on the perpendicular recording mode.

This and other objects are attained by the present invention which is defined below as (1) to (6).

(1) A magnetic recording medium for use in magnetic write/read operation by the perpendicular recording mode, comprising recording tracks each having an array of unit minute recording portions of a magnetic material separated by non-recording portions of a non-magnetic material, each unit minute recording portion having a surface area and a thickness, wherein the recording tracks include data regions and servo regions, the unit minute recording portions in the data regions have substantially the same surface area as the unit minute recording portions in the servo regions, and $AR_S/AR_D \geq 1.5$ provided that the unit minute recording portion has an aspect ratio which is the thickness divided by the square root of the surface area thereof, the unit minute recording portion in the data region has an aspect ratio $AR_D$, and the unit minute recording portion in the servo region has an aspect ratio $AR_S$.

(2) The magnetic recording medium of (1) wherein $AR_S/AR_D \leq 10$.

(3) The magnetic recording medium of (1) wherein $AR_D \leq 4$.

(4) The magnetic recording medium of (3) wherein $AR_D \geq 1$.

(5) The magnetic recording medium of (1) wherein the unit minute recording portions are constructed of any one of Co, Co—Cr, Co—Cr—Ta, Co—Cr—Pt, Co—Pt, Fe—Co, Fe—Co—Pt, and X-Y-Co wherein X is at least one of Dy, Gd and Tb and Y is at least one of La, Pr, Nd and Sm.

(6) The magnetic recording medium of (1) wherein each unit minute recording portion is a single magnetic domain.

OPERATION AND BENEFITS

According to the invention, the aspect ratio in the servo regions is set at least 1.5 times the aspect ratio in the data regions. With this setting, the unit minute recording portions in the servo regions have a sufficiently high coercivity as compared with those in the data regions. This prevents erasure of servo information even when a record erasing magnetic field to be applied to only the data region is inadvertently applied to the servo region, when the magnetic recording medium is re-formatted, or when the recorded data in the data region is erased by an external magnetic field other than the record erasing magnetic field.

BRIEF DESCRIPTION OF THE DRAWINGS

FIGS. 5A to 5K illustrate in cross-sectional view the steps of a further exemplary method for preparing the magnetic recording medium of the invention.

DESCRIPTION OF THE PREFERRED EMBODIMENTS

Figure 1:
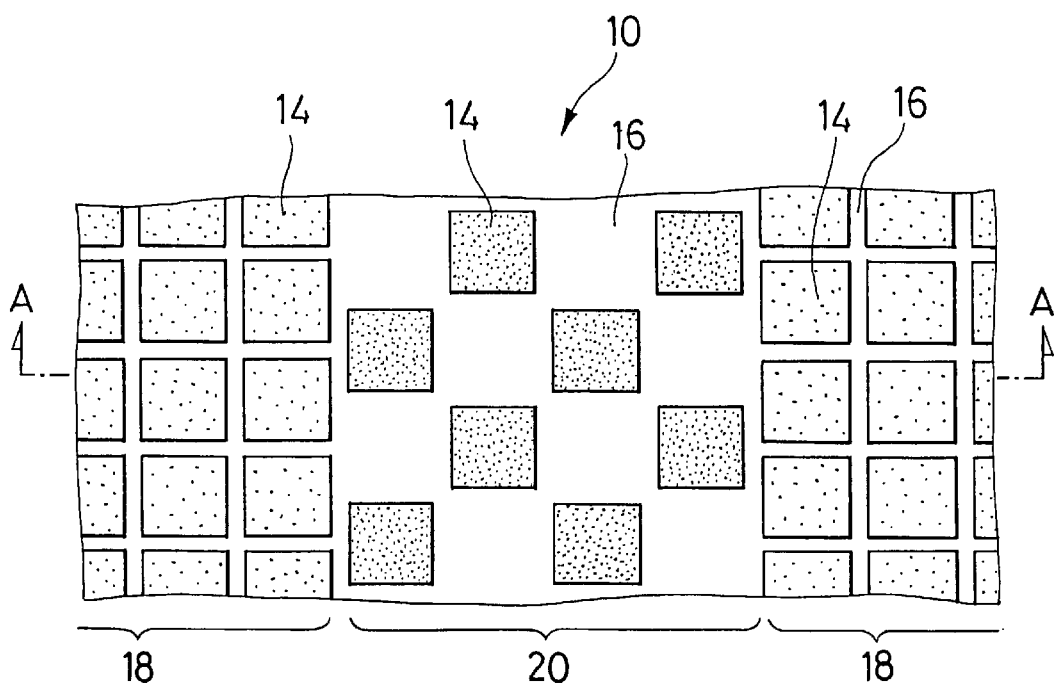
FIG. 1 is a plan view of a portion of a magnetic recording medium according to one embodiment of the invention.
Figure 2:
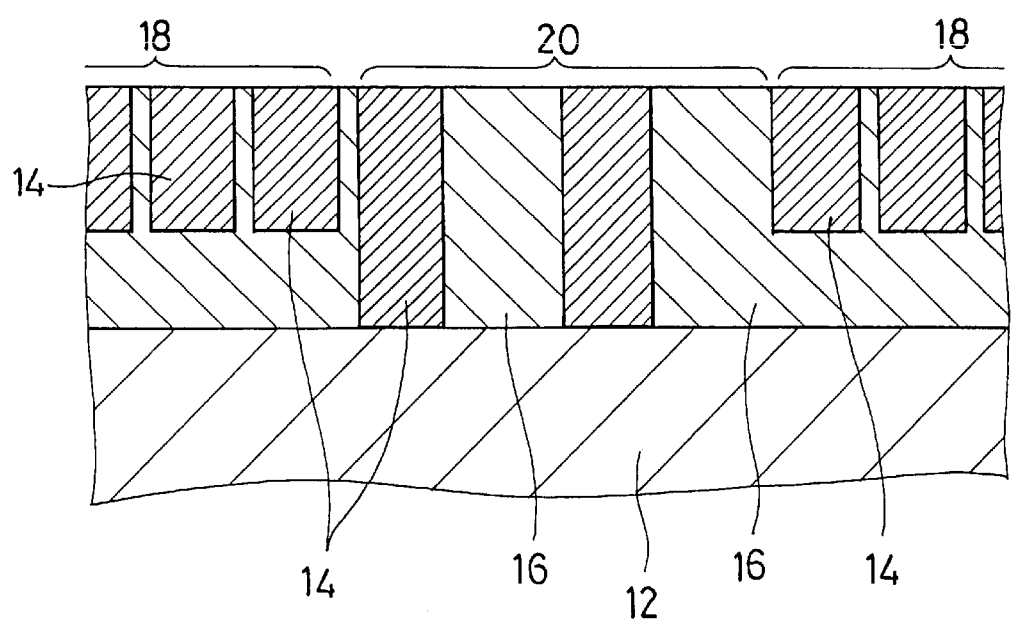
FIG. 2 is a cross-sectional view of the magnetic recording medium taken along lines A—A in FIG. 1.

The invention is mainly applied to magnetic disk media. FIG. 1 illustrates in plan view a magnetic disk medium according to one embodiment of the invention. FIG. 2 is a cross-sectional view taken along lines A—A in FIG. 1.

The magnetic disk medium 10 illustrated includes a disk-shaped substrate 12 and has a plurality of unit minute recording portions 14 arranged on the substrate in a concentric or spiral pattern and circumferentially and radially spaced apart from each other, and non-recording portions 16 intervening between adjacent unit minute recording portions 14. The unit minute recording portions 14 are constructed of a magnetic material capable of magnetically recording information whereas the non-recording portions 16 are constructed of a nonmagnetic material. Since the unit minute recording portions 14 are almost completely magnetically isolated from each other, the crosstalk or partial erasure between adjacent unit minute recording portions is prevented.

The surface shape (the shape as viewed from the front surface side of the medium) of unit minute recording portions 14 is not critical although a square, rectangular, circular or oval shape, for example, is preferred.

In the illustrated embodiment, recording tracks including unit minute recording portions extend laterally in the figure. The recording tracks are divided into data regions 18 where data to be rewritten are recorded and servo regions 20 where servo information that is permanent is recorded. In the servo regions, the unit minute recording portions 14 are straddled over two adjacent recording tracks and arranged in a staggered fashion.

The surface areas (the surface areas as viewed from the front surface side of the medium) of unit minute recording portions 14 are substantially equal between the data regions 18 and the servo regions 20. Specifically, the surface area of a unit minute recording portion in the servo region 20 is preferably 0.8 to 1.2 times the surface area of a unit minute recording portion in the data region 18. If the surface area of a unit minute recording portion in the servo region is largely different from the surface area of a unit minute recording portion in the data region, it is difficult to accomplish the benefits of the invention. It is noted that in both the servo regions and the data regions, the unit minute recording portions are constructed of the same material.

In this disclosure, the aspect ratio of the unit minute recording portion is defined as the thickness divided by the square root of the surface area. Provided that the unit minute recording portion in the data region 18 has an aspect ratio $AR_D$, and the unit minute recording portion in the servo region 20 has an aspect ratio $AR_S$, the invention should satisfy $AR_S/AR_D \geq 1.5$ and preferably $AR_S/AR_D \geq 3$. When $AR_S/AR_D$ is set within the range, the unit minute recording portions in the servo regions have a sufficiently higher coercivity than those in the data regions, which prevents inadvertent rewriting or erasure of servo information. However, if $AR_S/AR_D$ is too high, the coercivity becomes too high in the servo regions, making it difficult to record the servo information. Also the aspect ratio becomes too high in the servo regions, and as a result, it becomes difficult to form the unit minute recording portions in the servo regions. Further, if the aspect ratio becomes higher than a certain value, no further improvement in coercivity is obtained. For this reason, the invention should preferably satisfy $AR_S/AR_D \leq 10$ and more preferably $AR_S/AR_D \leq 5$.

Also, if $AR_D$ is too high, the coercivity becomes too high in the data regions, making it difficult to rewrite the information. For this reason, $AR_D \leq 4$ is preferred. However, if $AR_D$ is too low, magnetic recording in the data regions becomes less stable. For this reason, $AR_D \geq 1$ is preferred.

The surface size of unit minute recording portions 14 is not critical although it is preferred that one side length or diameter be 0.01 to 1.0 μm. In the case of a shape having major and minor axes, it is preferred that the major axis have a length of about 0.02 to 1.0 μm and the minor axis have a length of about 0.01 to 0.5 μm. The thickness of unit minute recording portions 14 is not critical although the thickness is preferably in the range of 0.01 to 1.0 μm.

Preferably each unit minute recording portion 14 has a single magnetic domain structure. The single magnetic domain structure permits the size of crystal grains of which the unit minute recording portion is constructed to be increased, which is effective for restraining the degradation of magnetization by thermal disturbances. The single magnetic domain structure also permits the switching speed of magnetization to be accelerated.

The magnetic material of which the unit minute recording portions 14 are constructed is not critical. The preferred materials are Co, Ni, Fe, and alloys containing at least one of these elements. Especially preferred is any one of Co, Co—Cr, Co—Cr—Ta, Co—Cr—Pt, Co—Pt, Fe—Co, Fe—Co—Pt, and X-Y-Co wherein X is at least one of Dy, Gd and Tb and Y is at least one of La, Pr, Nd and Sm.

In the magnetic recording medium of the invention, a subbing layer may be formed between the substrate 12 and the unit minute recording portions 14. The subbing layer is provided, for example, for enabling perpendicular orientation of the axis of easy magnetization of unit minute recording portions. The subbing layer for orientation may be formed, for example, of Pt or MgO and disposed contiguous to the unit minute recording portions 14. Since the medium of the invention is used in the perpendicular recording mode, a soft magnetic subbing film is preferably formed between the substrate 12 and the unit minute recording portions 14.

Further, like prior art media, a protective layer or lubricating layer may be provided on the medium surface to protect the medium surface from contact with the magnetic head. The protective layer may be formed, for example, of carbon or $SiO_2$ and by sputtering or the like. The lubricating layer may be formed of well-known lubricants and by spin coating or the like.

The nonmagnetic material of which the non-recording portions 16 are constructed is selected, for example, from oxides such as $SiO_2$, $Al_2O_3$ and $TiO_2$, nitrides such as $Si_3N_4$, AlN and TiN, carbides such as TiC, borides such as BN, and polymers of C, CH and CF systems.

The substrate 12 may be constructed of conventional magnetic disk substrate materials such as aluminum alloys, glass, silicon and glassy carbon. The substrate 12 usually has a thickness of about 500 to 1,000 μm.

Next, referring to FIGS. 3A to 3G, one exemplary method for preparing the magnetic recording medium of the invention is described.

Figure 3A:
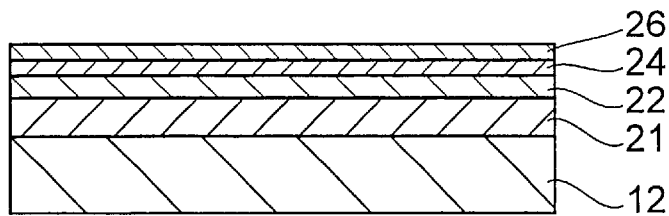
FIGS. 3A to 3G illustrate in cross-sectional view the steps of one exemplary method for preparing the magnetic recording medium of the invention.

First, as shown in FIG. 3A, on a substrate 12 of silicon or the like, a metal layer 21 of a nonmagnetic metal such as Au, Ti or Cr serving as an undercoat layer for electroplating, a nonmagnetic layer 22 to eventually form non-recording portions 16, a mask layer 24 composed of Cr or the like serving as a mask in forming the non-recording portions 16 by etching, and a resist layer 26 composed of polymethyl methacrylate (PMMA) or the like are successively formed. The metal layer 21, nonmagnetic layer 22 and mask layer 24 are preferably formed by vacuum deposition techniques such as sputtering and evaporation. The resist layer 26 may be formed, for example, by a coating technique.

Figure 3B:
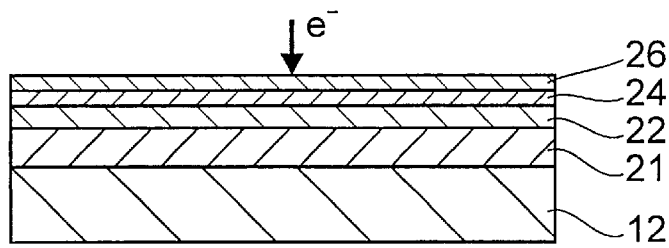

Then, as shown in FIG. 3B, using electron beam lithography, the resist layer 26 is irradiated in dots so as to form an array pattern of unit minute recording portions 14. By subsequent development, the resist layer 26 is patterned.

Figure 3C:
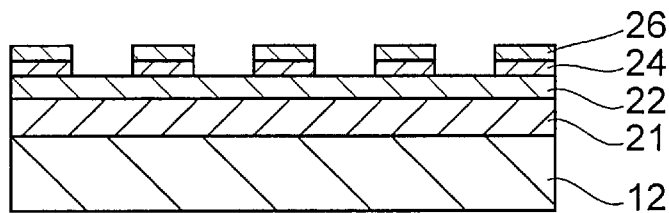

Then, the mask layer 24 is etched using the resist layer 26 as an etching mask as shown in FIG. 3C.

Figure 3D:
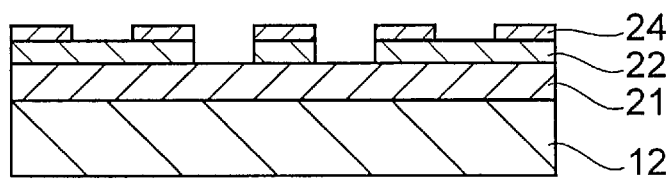
Figure 6:
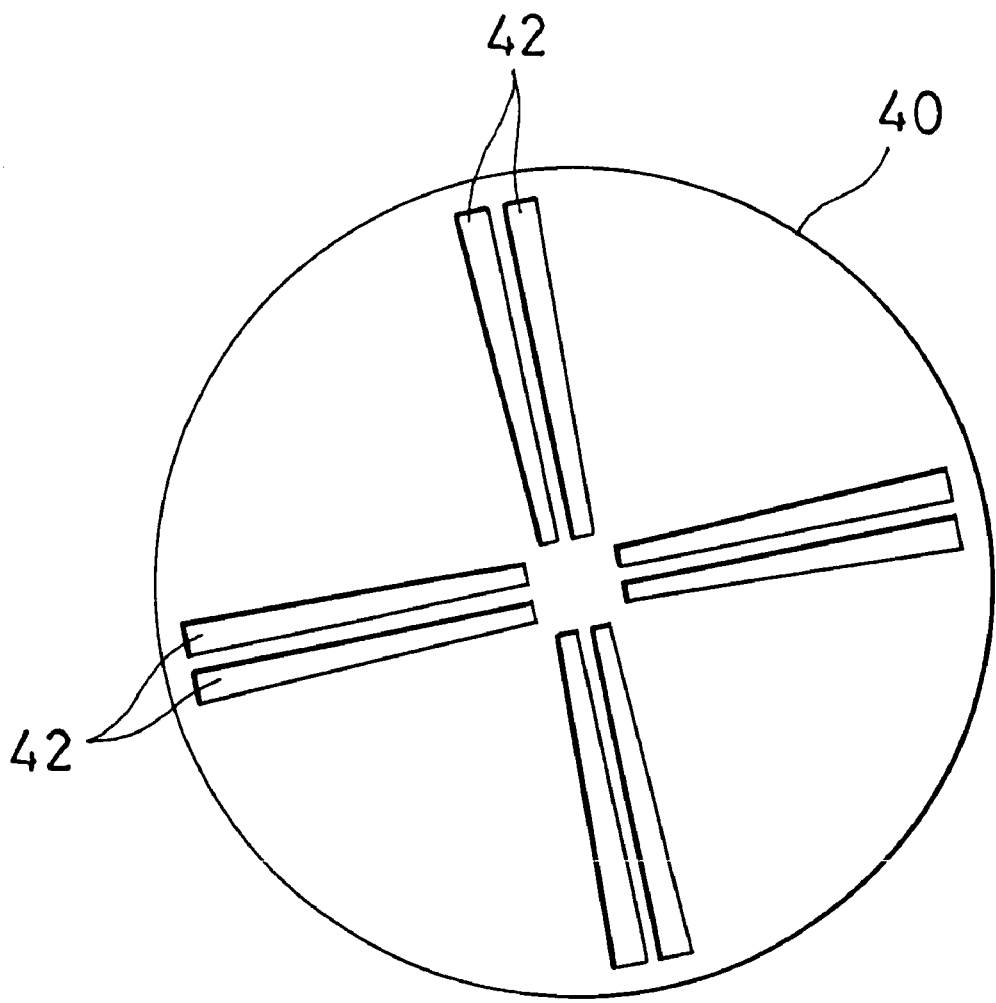
FIG. 6 is a plan view of a mask used in the preparation of the magnetic recording medium of the invention.

Then, a mask 40 as shown in FIG. 6 is furnished. The mask 40 has slots 42 corresponding to the servo regions 20 shown in FIG. 1. The mask 40 is placed on the patterned mask layer 24. Using the mask layer 24 as an etching mask, the nonmagnetic layer 22 is dry etched, giving a structure as shown in FIG. 3D. At this point, the depth of etching is set equal to the difference between the thickness of unit minute recording portions in the servo regions 20 and the thickness of unit minute recording portions in the data regions 18. It is noted that since this etching must expose the metal layer 21, the thickness of the nonmagnetic layer 22 is set not greater than the above-described difference, preferably smaller than the above-described difference. If the thickness of the nonmagnetic layer 22 is set smaller than the above-described difference, the metal layer 21 is also partially etched in a depth direction by this etching.

Figure 3E:
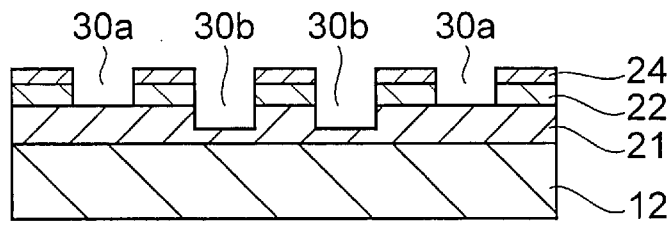

The mask 40 is then removed. By dry etching using the mask layer 24 as an etching mask, not only the exposed regions of the metal layer 21 are partially etched in a depth direction, but the now exposed regions of the nonmagnetic layer 22 which have been covered with the mask 40 are also etched. As a result, there are formed depressions 30a corresponding to the unit minute recording portions 14 in the data regions 18 and depressions 30b corresponding to the unit minute recording portions 14 in the servo regions 20, as shown in FIG. 3E. It is noted that the thickness of the metal layer 21 is set such that the metal layer 21 is left within the depressions 30b at the end of etching. The method of etching the nonmagnetic layer 22 and metal layer 21 is not critical and may be suitably chosen from various methods such as reactive ion etching (RIE) and ion milling.

Alternatively, the structure shown in FIG. 3E can be obtained by another procedure involving etching the structure shown in FIG. 3C without using the mask 40, then further etching only those regions corresponding to servo regions using the mask 40. In this embodiment, if the nonmagnetic layer 22 and the metal layer 21 have the thicknesses as illustrated, the nonmagnetic layer 22 and the metal layer 21 can be independently etched without a need for simultaneous etching, offering a higher degree of freedom of choice of the constituent materials and etching technique for both the layers.

Figure 3F:
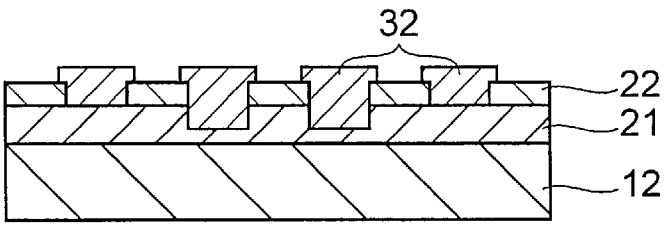
Figure 3G:
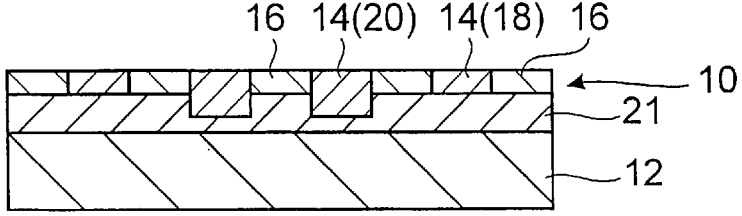

Subsequently, as shown in FIG. 3F, the depressions 30a and 30b are filled with a magnetic material 32 such as cobalt using an electroplating technique. At this point, the magnetic material 32 protrudes beyond the surface of the nonmagnetic layer 22. Chemical mechanical polishing (CMP) is then effected. Since the nonmagnetic layer 22 becomes a stop against polishing, the protruded portions of the magnetic material 32 are removed, giving a structure as shown in FIG. 3G. It is noted that the chemical mechanical polishing may be effected, for example, at about pH 9 to 12 using $SiO_2$ having a particle size of 20 to 60 nm. In this way, there is obtained a magnetic disk medium 10 in which the thickness of unit minute recording portions 14 in the servo regions 20 is greater than the thickness of unit minute recording portions 14 in the data regions 18 and the entire surface is fully flat.

Next, referring to FIGS. 4A to 4G, another exemplary method for preparing the magnetic recording medium of the invention is described. This method is substantially the same as the method illustrated in FIGS. 3A to 3G except that the magnetic material 32 is formed by vacuum deposition techniques such as sputtering and evaporation.

In this method, electroplating is not utilized for depositing the magnetic material 32. Accordingly, unlike FIG. 3A, the metal layer 21 is not formed in FIG. 4A.

Figure 4A:
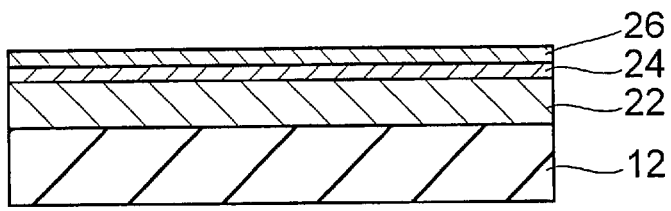
FIGS. 4A to 4G illustrate in cross-sectional view the steps of another exemplary method for preparing the magnetic recording medium of the invention.
Figure 4B:
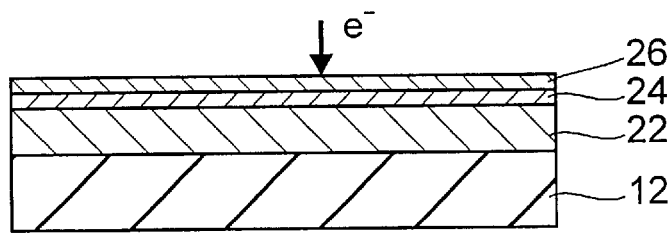
Figure 4C:
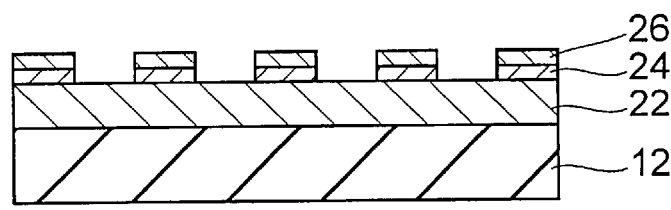

Like the steps shown in FIGS. 3B and 3C, the steps shown in FIGS. 4B and 4C are carried out until the mask layer 24 is patterned.

Figure 4D:
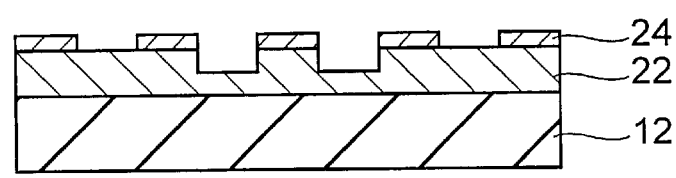
Figure 4E:
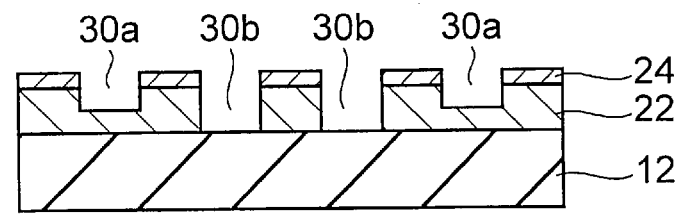

In the step shown in FIG. 4D, the nonmagnetic layer 22 is partially etched in a thickness direction using the mask 40 shown in FIG. 6. With the mask 40 removed, etching is continued, giving a structure as shown in FIG. 4E. Alternatively, the structure shown in FIG. 4E can be obtained by another procedure involving etching the structure shown in FIG. 4C without using the mask 40, then further etching only those regions corresponding to servo regions using the mask 40.

Figure 4F:
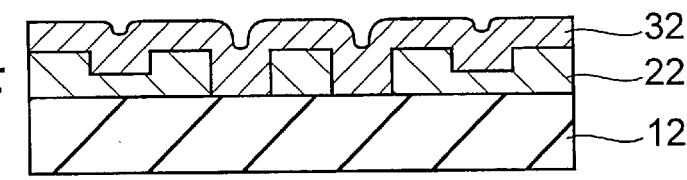
Figure 4G:
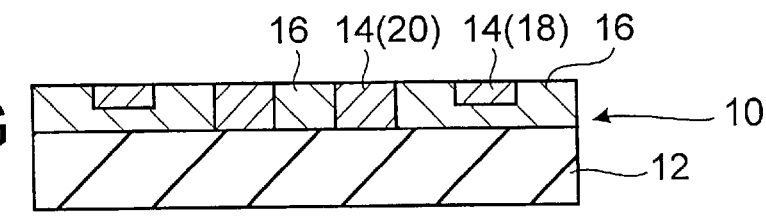

Thereafter, a magnetic material 32 is deposited by a sputtering, vacuum evaporation or other technique, giving a structure as shown in FIG. 4F. Then those portions of the magnetic material 32 protruding above the surface of the nonmagnetic layer 22 are removed by CMP, giving a structure as shown in FIG. 4G to complete a magnetic disk medium 10.

Next, referring to FIGS. 5A to 5K, a further exemplary method for preparing the magnetic recording medium of the invention is described.

In this method, as shown in FIG. 5A, a substrate 12 is first provided in its surface with a recess 30c which encompasses the entirety of a servo region. The recess can be formed by electron beam lithography or photolithography. The depth of the recess 30c is set equal to the difference between the thickness of unit minute recording portions in the servo regions and the thickness of unit minute recording portions in the data regions.

Then, as shown in FIG. 5B, a magnetic material 32 is deposited on the surface of the substrate 12 by sputtering or the like. A carbon layer 33 is formed on the magnetic layer 32 by sputtering or the like.

Then, a resist layer 26 is formed on the carbon layer 33 as shown in FIG. 5C. This resist layer 26 is patterned into an array pattern of unit minute recording portions 14, giving a structure as shown in FIG. 5D.

Then, a mask layer 24 is formed on the resist layer 26 and the exposed surface of the carbon layer 33 as shown in FIG. 5E, and the resist layer 26 is then removed together with the overlying mask layer 24 as shown in FIG. 5F.

Figure 5G:
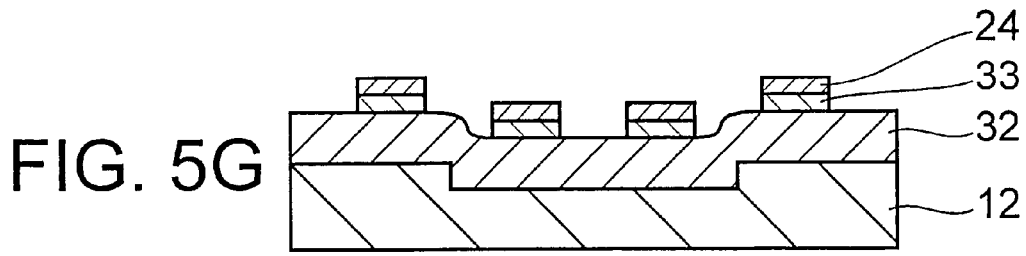

Then, as shown in FIG. 5G, the carbon layer 33 is etched by RIE with oxygen gas or the like while using the mask layer 24 as an etching mask.

Figure 5H:
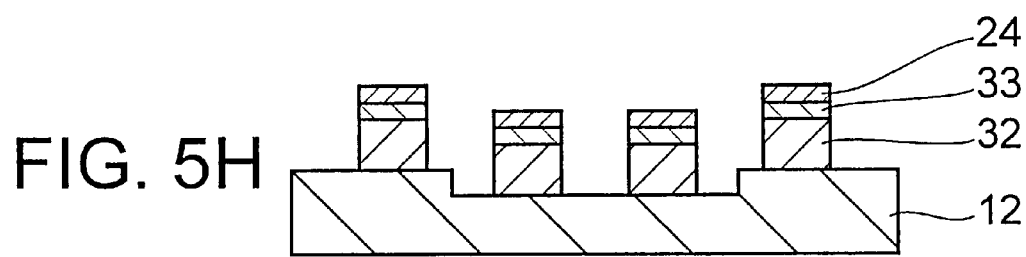

Then, as shown in FIG. 5H, the magnetic material 32 is etched by RIE or the like while using the mask layer 24 as an etching mask.

Figure 5I:
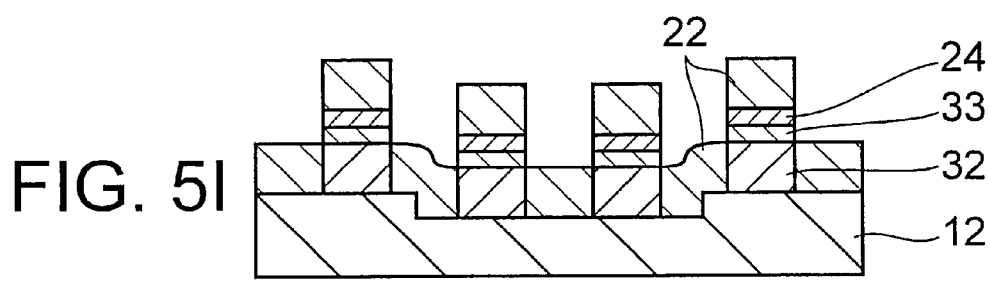

Then, as shown in FIG. 5I, a nonmagnetic layer 22 is formed on the mask layer 24 and the exposed surface of the substrate 12.

Figure 5J:
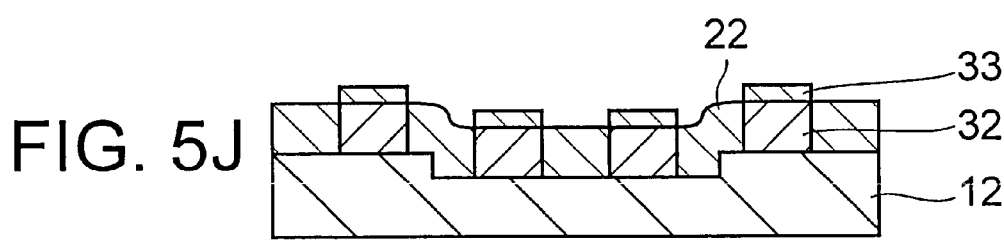

Then, by ultrasonic cleaning or the like, the mask layer 24 and the overlying nonmagnetic layer 22 are removed, giving a structure as shown in FIG. 5J. It is noted that the carbon layer 33 is provided such that the mask layer 24 may be stripped by ultrasonic cleaning.

Figure 5K:
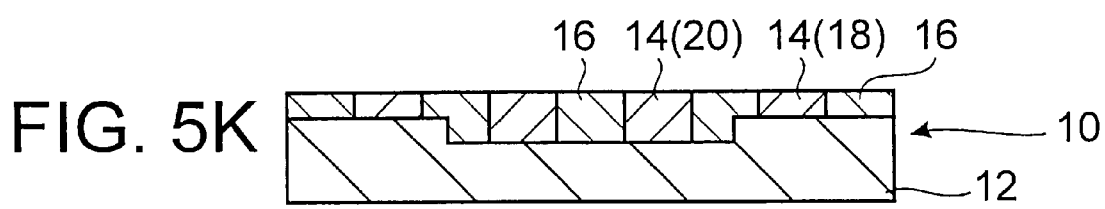

Then, the carbon layer 33 remaining on the magnetic material 32 is removed by RIE with oxygen gas or the like. Subsequently, the surface of the magnetic material 32 and nonmagnetic layer 22 is smoothened by CMP or the like, giving a structure as shown in FIG. 5K to complete a magnetic disk medium 10.

EXAMPLE

Magnetic disk medium samples as shown in Table 1 were prepared by the method shown in FIGS. 4A to 4G. The unit minute recording portions were constructed of cobalt and the non-recording portions were constructed of silicon dioxide ($SiO_2$). The surface shape of unit minute recording portions was square. In each sample, this square has a side length L as shown in Table 1. The array pitch of unit minute recording portions was equal to 2L in both longitudinal and transverse directions of a recording track. It is noted that L=56 nm corresponds to a recording density of 50 Gb/in$^2$, L=40 nm corresponds to a recording density of 100 Gb/in$^2$, and L=28 nm corresponds to a recording density of 200 Gb/in$^2$. For each sample, the aspect ration $AR_D$ in the data region, the aspect ratio $AR_S$ in the servo region, and $AR_S/AR_D$ are reported in Table 1.

For these samples, the coercivity Hc of a unit minute recording portion in each of the data and servo regions is shown in Table 1. It is noted that this coercivity is a measurement by a vibrating sample magnetometer (VSM) on a test sample in which a unit minute recording portion having a dimension and an aspect ratio shown in Table 1 is formed on a square substrate of 5 mm×5 mm. The test samples were prepared by the method shown in FIGS. 4A to 4G except that the step of FIG. 4D, that is, the step of forming unit minute recording portions which are different in thickness was omitted.

These samples were initialized by applying a uniform external magnetic field for magnetizing all the unit minute recording portions in one direction.

In this state, a recording magnetic field complying with the recording conditions of data regions was applied to the data and servo regions to examine whether or not the magnetization of servo regions was reversed. In Table 1, those samples undergoing no magnetization reversal are rated "O" and those samples undergoing magnetization reversal are rated "X."

TABLE 1

| Sample No. | L (nm) | Data region | | Servo region | | $AR_S/AR_D$ | Rating |
|---|---|---|---|---|---|---|---|
| | | $AR_D$ | Coercivity (Oe) | $AR_S$ | Coercivity (Oe) | | |
| 101** | 56 | 2 | 410 | 2 | 410 | 1* | X |
| 102** | 56 | 2 | 410 | 2.5 | 500 | 1.25* | X |
| 103 | 56 | 2 | 410 | 3 | 630 | 1.5 | O |
| 104 | 56 | 2 | 410 | 4 | 800 | 2 | O |
| 105 | 56 | 2 | 410 | 6 | 1000 | 3 | O |
| 106 | 56 | 2 | 410 | 8 | 1050 | 4 | O |
| 107 | 56 | 2 | 410 | 10 | 1130 | 5 | O |

TABLE 1-continued

| Sample No. | L (nm) | Data region | | Servo region | | $AR_S/AR_D$ | Rating |
|---|---|---|---|---|---|---|---|
| | | $AR_D$ | Coercivity (Oe) | $AR_S$ | Coercivity (Oe) | | |
| 201** | 40 | 2 | 860 | 2 | 860 | 1* | X |
| 202** | 40 | 2 | 860 | 2.5 | 1100 | 1.25* | X |
| 203 | 40 | 2 | 860 | 3 | 1350 | 1.5 | O |
| 204 | 40 | 2 | 860 | 4 | 1600 | 2 | O |
| 205 | 40 | 2 | 860 | 6 | 1820 | 3 | O |
| 206 | 40 | 2 | 860 | 8 | 1880 | 4 | O |
| 207 | 40 | 2 | 860 | 10 | 1900 | 5 | O |
| 301** | 28 | 2 | 1800 | 2 | 1800 | 1* | X |
| 302** | 28 | 2 | 1800 | 2.5 | 2200 | 1.25* | X |
| 303 | 28 | 2 | 1800 | 3 | 2600 | 1.5 | O |
| 304 | 28 | 2 | 1800 | 4 | 2860 | 2 | O |
| 305 | 28 | 2 | 1800 | 6 | 2960 | 3 | O |
| 306 | 28 | 2 | 1800 | 8 | 3200 | 4 | O |
| 307 | 28 | 2 | 1800 | 10 | 3200 | 5 | O |

*outside the limited range
**comparison

It is evident from Table 1 that as long as $AR_S/AR_D$ falls within the range of the invention, the unit minute recording portions in the servo regions undergo no magnetization reversal, independent of their surface dimension. That is, the servo information is not erased even when a recording magnetic field for recording information in the data regions is inadvertently applied to the servo regions. In contrast, those samples whose $AR_S/AR_D$ was below the range of the invention underwent magnetization reversal in the servo regions and were no longer operative.

The effectiveness of the invention is evident from the foregoing Example.

What is claimed is:

1. A magnetic recording medium for use in magnetic write/read operation by the perpendicular recording mode, comprising recording tracks each having an array of unit minute recording portions of a magnetic material separated by non-recording portions of a nonmagnetic material, each said unit minute recording portion having a surface area and a thickness, wherein said recording tracks include data regions and servo regions, the unit minute recording portions in the data regions have substantially the same surface area as the unit minute recording portions in the servo regions, and $AR_S/AR_D \geq 1.5$ provided that said unit minute recording portion has an aspect ratio which is the thickness divided by the square root of the surface area thereof, said unit minute recording portion in the data region has an aspect ratio $AR_D$, and said unit minute recording portion in the servo region has an aspect ratio $AR_S$.

2. The magnetic recording medium of claim 1 wherein $AR_S/AR_D \leq 10$.

3. The magnetic recording medium of claim 1 wherein $AR_D \leq 4$.

4. The magnetic recording medium of claim 3 wherein $AR_D \geq 1$.

5. The magnetic recording medium of claim 1 wherein said unit minute recording portions comprise at least one material selected from the group consisting of Co, Co—Cr, Co—Cr—Ta, Co—Cr—Pt, Co—Pt, Fe—Co, Fe—Co—Pt, and X—Y—Co wherein X is at least one element selected from the group consisting of Dy, Gd and Tb and Y is at least one element selected from the group consisting of La, Pr, Nd and Sm.

6. The magnetic recording medium of claim 1 wherein each said unit minute recording portion is a single magnetic domain.

7. The magnetic recording medium of claim 1 wherein $AR_S/AR_D \geq 3$.

8. The magnetic recording medium of claim 1 wherein $AR_S/AR_D \leq 5$.

9. The magnetic recording medium of claim 1 wherein the unit minute recording portions each have a length of one side or diameter of 0.01 to 1.0 μm.

10. The magnetic recording medium of claim 1 wherein the unit minute recording portions have a major and minor axis and the major axis has a length of 0.02 to 1.0 μm and the minor axis has a length of 0.01 to 0.5 μm.

11. The magnetic recording medium of claim 1 wherein the unit minute recording portions have a thickness in the range of 0.01 to 1.0 μm.

12. The magnetic recording medium of claim 1 wherein the magnetic recording medium further comprises a protective or lubricating layer disposed on the surface of the magnetic recording medium.

13. The magnetic recording medium of claim 12 wherein the protective layer comprises carbon or $SiO_2$.

14. The magnetic recording medium of claim 1, wherein the nonmagnetic material is selected from the group consisting of $SiO_2$, $Al_2O_3$, $TiO_2$, $Si_3N_4$, AlN, TiN, TiC, BN, and polymers of C, CH, or CF.

15. The magnetic recording medium of claim 1, further comprising a substrate comprising a material selected from the group consisting of aluminum alloys, glass, silicon, and glassy carbon.

16. The magnetic recording medium of claim 15, wherein the substrate has a thickness of 500 to 1000 μm.

* * * * *